United States Patent [19]

Clauson et al.

[11] Patent Number: 4,720,427

[45] Date of Patent: Jan. 19, 1988

[54] ORIENTED MULTI-LAYER HEAT SEALABLE FILM

[75] Inventors: Melvil B. Clauson, Raymond, N.H.; John R. Wagner, Jr., Rochester, N.Y.

[73] Assignee: Mobil Oil Corporation, New York, N.Y.

[21] Appl. No.: 918,963

[22] Filed: Oct. 15, 1986

Related U.S. Application Data

[63] Continuation-in-part of Ser. No. 838,203, Mar. 7, 1986, abandoned, and Ser. No. 791,961, Oct. 28, 1985, abandoned.

[51] Int. Cl.$^4$ .............................................. B32B 27/00
[52] U.S. Cl. .................................... 428/349; 428/35; 428/516; 428/520
[58] Field of Search ................ 428/349, 516, 35, 520, 428/522

[56] References Cited

U.S. PATENT DOCUMENTS

| | | | |
|---|---|---|---|
| 4,205,021 | 5/1980 | Morital et al. | 525/240 |
| 4,211,039 | 7/1980 | Steiner | 428/520 |
| 4,440,911 | 4/1984 | Inoue | 525/301 |
| 4,442,158 | 4/1984 | Distler | 428/516 |
| 4,447,494 | 5/1984 | Wagner et al. | 428/516 |

*Primary Examiner*—Edith Buffalow
*Attorney, Agent, or Firm*—A. J. McKillop; M. G. Gilman; J. P. O'Sullivan, Sr.

[57] ABSTRACT

An oriented multi-layer heat sealable film structure comprising a polyolefin film substrate, a layer of a linear very low density copolymer of ethylene and a $C_4$-$C_8$ alpha olefin or a blend of the same with polypropylene. This structure can also have a primer layer on said copolymer or blend layer and a heat-sealable layer on said primer layer.

15 Claims, No Drawings

ORIENTED MULTI-LAYER HEAT SEALABLE FILM

This is a continuation-in-part application of Ser. No. 838,203, filed Mar. 7, 1986 and Ser. No. 791,961, filed Oct. 28, 1985 both now abandoned.

BACKGROUND OF THE INVENTION

The present invention relates to a laminar oriented thermoplastic film structure characterized by having a base layer and a heat sealable skin layer; and it also relates to a flexible multi-layer heat sealable general purpose packaging film.

In packaging applications using thermoplastic films, for example, polypropylene, it is usually necessary to seal the film during the packaging operation. This may be accomplished by using adhesives or by using heat sealing techniques. The particular heat sealing technique depends on the properties of the thermoplastic film, the packaging application, and the packaging technique being used.

In the packaging of certain types of foods, for example, loose products such as cookies, potato chips, and the like, it is common practice to employ a multi-layer film having two or more polymeric layers wherein one of the layers is known to be an effective heat seal layer. In the packaging process, a supply of such a multi-layer film can be shaped into a tube in a vertical form and fill machine. Marginal regions of the heat seal layer are brought into face to face relationship and heat sealed together. Thereafter, the packaging machine automatically forms a heat seal and makes a horizontal severance across the bottom of the bag; product is dispensed into the open end of the tube and, thereafter, a second horizontal seal is effected across the tube with a simultaneous severing through the tube to result in a product packaged in a tube, heat sealed at both ends and along one seam at right angles to the end seals. While the food or other product is being dispensed into the package, air is also present in the package and this air assists in protecting and cushioning the product during subsequent shipment of the finished packages. During shipment of the product, particularly with large size bags, e.g., those containing 16 ounces of product, the bags have a tendency to split or burst at the end seals.

The use of heat sealing techniques on oriented films may result in the loss of orientation in the vacinity of the heat seal. Heat sealed oriented films may, therefore, exhibit inferior and unacceptable film appearance and properties. In order to heat seal oriented films and obtain acceptable product properties, it may be necessary to apply to the oriented film a coating or laminar layer which has a melting point which is less than the orientation temperature of the oriented film. The application of the heat sealable laminar layer to the base oriented film may be accomplished utilizing various techniques including, melt extrusion of the heat sealable layer onto a preformed oriented base web employing adhesive material, or heat welding of the individual layers together. Preferred techniques are full extrusion of the individual layers followed by biaxial stretching of the multi-layer sheet so formed, or alternatively, extrusion coating of the heat sealable layer onto at least one surface of the longitudinally oriented substrate layer followed by stretching in the transverse direction.

In the past, coextruded oriented films have been prepared in which the oriented polypropylene core is coated with a skin layer comprising ethylene-propylene random copolymer containing minor amounts of ethylene. Such laminar films exhibit high heat seal strength but because of the relatively high melting point of the copolymer skin, i.e., in the order of from about 285° F. to about 305° F., the temperature range over which useable heat seal may be formed is quite narrow, i.e, about 10°-20° F.

Similarly, in the past, coextruded oriented films have been prepared wherein the core is an oriented polypropylene and the skin layers are comprised of low density polyethylene which has been polymerized utilizing conventional free radical-catalyzed processes. In the case of such laminates, because of the lower melting point of the low density polyethylene skin resin than that of the hereinabove-described ethylene-propylene copolymer skins, a broader sealing range is achieved. However, the seal strength provided by a skin comprised of such polyethylene homopolymers, polymerized by a free radical-catalyzed process, are not as high as those provided by an ethylene-propylene random copolymer skin. Moreover, the haze and gloss values of such films are poorer than the haze and gloss values exhibited by oriented polypropylene film.

As indicated above, in packaging applications utilizing polypropylene based film it is usually necessary to seal the film during the packaging operation. A multi-layered wrapping film of this type is described in U.S. Pat. No. 4,214,039, the subject matter of which is, in its entirety, incorporated by reference herein. This patent describes a packaging film structure comprising a polypropylene film substrate having a heat-sealable vinylidene chloride polymer containing at least 50% by weight of vinylidene chloride. In between the polypropylene film and the vinylidene chloride polymer is a primer coat which consists of the reaction product of an acidified aminoethylated vinyl polymer and an epoxy resin. This primer coat enhances the bond strength between the propylene and the heat sealable vinylidene chloride polymer. While this packaging material is effective for the packaging of comparatively small quantities of a product, there exists a need to increase its seal strength when used for the packaging of comparatively large quantities of product. Particularly, there is a need to increase the seal strength between the polypropylene layer and the primer layer.

SUMMARY OF THE INVENTION

In accordance with the present invention, there is provided a film laminate of a base layer of a polyolefin and a heat seal layer on one or both sides thereof of a layer that at least includes some linear very low density copolymer of ethylene and a $C_4$–$C_8$ alpha olefin (LVLDPE). In a preferred embodiment of the invention the structure is a laminar thermoplastic film, preferably oriented, comprising a substrate comprising a polyolefin layer having on at least one side thereof a layer comprising an LVLDPE or a blend of (I) LVLDPE and (II) a polyolefin.

A further embodiment of the invention is directed to an oriented heat sealable multi-layer structure comprising:

(a) a substrate comprising a polyolefin film;
(b) a layer on at least one surface of (a), said layer comprising a linear very low density copolymer of ethylene and a $C_4$–$C_8$ alpha olefin or a blend of (I) said copolymer and (II) polypropylene;

(c) a primer coating on at least one surface of said layer (b); and (d) a heat sealable layer on said coating (c), said heat sealable layer comprising a member of the group consisting of an acrylic polymer layer and a vinylidene chloride polymer layer.

In preferred forms of the above-identified structure, one or both sides of the film can have either an acrylic or a vinylidene chloride polymer layer. Alternatively, one surface of the film may be a heat sealable acrylic layer while the opposite surface is a heat sealable vinylidene chloride polymer layer.

The method of producing this structure comprises:

coextruding a substrate comprising a polyolefin film, the layer comprising either a linear very low density copolymer or a blend of (I) the copolymer and (II) polypropylene, the coextrusion being on at least one surface of said polyolefin substrate;

biaxially orienting the coextrudate;

applying a primer coating to the surface of the coextrudate; and applying a heat sealable layer on said primer coating, said heat sealable layer comprising a member selected from the group consisting of an acrylic polymer and a vinylidene chloride polymer.

DESCRIPTION OF THE PREFERRED EMBODIMENTS

The polyolefins contemplated as the substrate or core material of the subject film structures include polyethylene, polypropylene, polybutene, etc. and copolymers and blends thereof. Particularly preferred is an isotactic polypropylene containing at least 80% by weight of isotactic polypropylene. It is preferred that the polypropylene have a melt flow of from about 2 to 8 g/10 minutes. The polypropylene homopolymer can have a melting point range of from about 321°–336° F. A commercially available material of this description is ARCO W472, from ARCO Corporation.

The linear very low density copolymer of ethylene and a $C_4$–$C_8$ alpha olefin (LVLDPE), or blend thereof, contemplated herein as the heat seal layer or intermediate layer between a substrate film and a primer layer, functions to give excellent ESM seals or crimp seals. It was originally not believed that the linear very low density copolymer, or a blend containing the same, would provide a very effective heat seal bond between mating surfaces. It was believed that its best utility was as an intermediate layer between some substrate film and a primer for a conventional heat seal material, such as, an acrylic or a vinylidene chloride heat seal layer. It was discovered, however, that the linear very low density copolymer layer, per se, or the same blended with another polyolefin, would form a heat seal layer with a like layer having exceptional strength. This provided the advantage of making available to the art a much simpler and more inexpensive heat seal layer. These linear polyethylenes are copolymers of ethylene and a $C_4$–$C_8$ alpha olefin having exceptionally low density. They have a density range of less than about 0.910 g/cc and more specifically, from about 0.890 to about less than 0.910 g/cc. The $C_4$–$C_8$ comonomers include the alpha olefins butene, hexene and octene. The alpha olefin comonomer is present in the copolymer in an amount of about 15% by weight. A range of from about 11–20 wt.% of this comonomer will yield a linear low density copolymer falling within the defined density range. These materials are of low crystallinity and are produced in a low pressure process. For processing, melt temperatures of between 400° and 450° F. are recommended. Specific materials commercially available are DFDA-1137, having a density of 0.906 g/cc and a melt index of 0.8 g/10 minutes; and DFDA-1138, having a density of 0.900 g/cc and a melt index of 0.40 g/10 minutes. These materials are available from Union Carbide Corporation, Danbury, CT. When the LVLDPE is blended with, for example, polypropylene, to form a heat seal layer or layers on a base layer, it can be in the ratio of about 2–100 wt.% LVLDPE and 98–0 wt.% polypropylene. Heat seal layers of any combination of these two materials in the ranges stated will produce a heat seal significantly better than that of a polypropylene surface alone and better than many other heat seal systems. In preparing a multi-layer structure, the polypropylene and the LVLDPE or blends thereof are coextruded so that the LVLDPE or blend is from about 2 to about 12% of the total thickness of these 2 layers. For some purposes, a layer of the LVLDPE can be on both surfaces of a core layer of polypropylene, in which case the two LVLDPE layers would amount to from 4 to 24% of the total thickness of the three layers. In preparing the coextruded film it has been found advantageous and convenient to recycle certain quantities of scrap extrudate back into the base polymer polypropylene. Thus, the homopolymer polypropylene can have from 0 to 25% of reclaimed material interblended therein. This recycle material can contain from 0 to about 15% of the LVLDPE or blends therein.

The LVLDPE layer is not always the optimum heat seal layer to be employed in packaging. As indicated above, certain prior art heat sealable acrylic polymers and a vinylidene chloride polymer are optimum for some purposes. These latter two heat seal layers do not adhere well to polyolefin film surfaces even when such a surface has been subjected to well know pretreatment operations such as, for example, treatment by corona discharge, flame, or oxidizing chemicals. The same has been found to be true in attempting to adhere the prior art heat seal layers to the surface of LVLDPE layers. It has been found, however, that the use of certain primers intermediate between the LVLDPE skin layer and the heat seal layer provides an unexpectedly high level of adherence. As a result, all layers adhere to its adjacent layer with unexpectedly high tenacity.

The system contemplated for the formation of the multi-layer packaging material of the present invention involves the use of one layer, i.e., LVLDPE, applied to one or both surfaces of the chosen suubstrate layer or the use of three layers applied to the surface of the chosen substrate layer, these being the LVLDPE layer, a primer layer and the selected heat seal layer. Examples of primer materials include those defined in UK Pat. No. 1,134,876 which discloses a primer produced by condensing a monoaldehyde with an interpolymer of acrylamide or methacrylamide and at least one other unsaturated monomer; and those defined in UK Pat. No. 1,174,328 which discloses a material resulting from condensing aminoaldehyde with acrylamide or methacrylamide and subsequently interpolymerizing the condensation product with at least one other unsaturated monomer in the presence of a $C_1$–$C_6$ alkanol. A preferred primer coating resin of this type comprises a copolymer containing up to 90% by weight of styrene, up to 80% by weight of an alkyl acrylate, up to 15% by weight of methacrylic acid and 5% to 25% by weight of acrylamide which has been condensed with a solution of formaldehyde in n-butanol containing from 0.2 to 3 equivalents of formaldehyde for each amide group in the copolymer. Another primer resin of this type is a 50% solid solution of a copolymer resin containing 38.5 parts of styrene, 44 parts of ethyl acrylate, 2.5 parts of methacrylic acid and 15 parts of acrylamide which has been condensed with 5.2 parts of formaldehyde in n-butanol.

A particularly preferred primer material for the acrylic type heat seal layers contemplated herein has been found to be poly(ethyleneimine). The imine primer provides an overall adhesive active surface for thorough and secure bonding with the subsequently applied heat seal composition of this invention. It has been found that an effective coating solution concentration of the poly(ethyleneimine) applied from either aqueous or organic solvent media, such as ethanol, is a solution comprising about 0.1–0.6% by weight of the poly(ethyleneimine). A commercially available material of this type is known as Polymin M, a product of BASF-Wyandotte Corp.

Another particularly preferred primer material is the reaction product of an epoxy resin and an acidified amminoethylated vinyl polymer. The contemplated epoxy resins are glycidyl ethers of polyhydroxy compounds. Typical polyhydroxy compounds which may be used include bisphenol A, ring substituted bisphenol A, resorcinol, hydroquinone, phenol-formaldehyde novolac resins, aliphatic diols, such as ethylene glycol, propylene glycol, 1,4-butanediol, 1,6-hexane-diol, glycerol, lower alkyl hydantoins and mixtures thereof. The preferred epoxy resins of the present invention are those made by the glycidation reaction between epichlorohydrin and bisphenol A. Epoxy resins of this type are commonly classified by their epoxy equivalent weight (EEW) which is defined as the weight of resin in grams which contains one gram equivalent of epoxy groups. Resins with an EEW ranging from 170 to 280 may be used in the present invention, but the preferred range is 180 to 210.

Although the specific structure of the epoxy resin is not critical to the primer employed in the present invention, important considerations in the selection of the epoxy resin revolve around its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer compositions of the present invention is an amino modified acrylic polymer which is water soluble. This polymer is a curing agent for the epoxy compound. The preferred material is described in U.S. Pat. No. 3,719,629, the disclosure of which is incorporated herein by reference. This material may be generically described as an acidified aminoethylated interpolymer having pendent aminoalkylate groups. This material is produced by polymerizing acrylate, methacrylate, styrene or other suitable monomers with sufficient methacrylic or acrylic acid to give a —COOH content of about 7.5 to about 12.5%. Solvent polymerization techniques are preferred. The polymer is then reacted with ethyleneimine monomer and acidified with hydrochloric acid to render the polymer water soluble.

In one embodiment of the present invention, a liquid epoxy resin is emulsified in a solution of the curing agent by rapid stirring, the resultant dispersion is diluted with water to the desired concentration for coating, usually from about 2 to about 25% solids. When mixing the epoxy resin with the curing agent, it is generally preferred to use a stochiometric equivalent balance of epoxy and amine groups. However, it has been found that the stochiometric ratio may be varied over a wide range, from about one epoxy to about three amine groups through three epoxy groups to one amine group.

The composition of the heat sealable acrylic interpolymer is that defined in U.S. Pat. No. 3,753,769, the disclosure of which is, in its entirety, incorporated by reference herein. This material consists essentially of an interpolymer of from about 2 to about 15 parts, and preferably from about 2.5 to about 6 parts by weight of acrylic acid, methacrylic acid or any mixture thereof and from about 85 to about 98 parts and preferably from about 94 to about 97.5 parts by weight of neutral monomer esters, said neutral monomer esters preferably comprising (1) methyl acrylate or ethyl acrylate and (2) methyl methacrylate. The interpolymer compositions are further characterized by preferably comprising from about 30% to about 55% by weight of methyl methacrylate when said alkyl acrylate is methyl acrylate, and from about 52.5% to about 69% by weight of methyl methacrylate when said alkyl acrylate is ethyl acrylate. The monomer components of the acrylic terpolymer are employed in a ratio such that the alkyl methacrylate monomer is present in an amount of at least 10% by weight of the total terpolymer composition and preferably from about 20 to about 80% by weight, and the alkyl acrylate monomer component in amounts of at least 10% by weight of the total composition, and preferably from about 80 to about 20% by weight.

As indicated above it is contemplated herein that one surface of the structure can be of the above described acrylic heat seal material and the opposite surface can be of a vinylidene chloride polymer heat seal material. Commercially available vinyldene chloride latexes having a vinylidene chloride content of at least 50% and preferably from about 75% to about 92% may be employed. The other ethylenically unsaturated comonomers may include alpha, beta-ethylenically unsaturated acids, such as acrylic and methacrylic acids; alkyl esters containing 1–18 carbon atoms of said acids, such as, methylmethacrylate, ethyl acrylate, butyl acrylate, etc. In addition, alpha, beta-ethylenically unsaturated nitrile such as acrylonitrile and methacrylonitrile can be employed. In addition, monovinyl aromatic compounds such as styrene and vinyl chloride may be employed.

Specific vinylidene polymer latexes contemplated comprise: 82% by weight vinylidene, 14% by weight ethyl acrylate and 4% by weight acrylic acid. Alternatively, a polymer latex comprising about 80% by weight vinylidene chloride, about 17% by weight methylacrylate and about 3% by weight methacrylic acid can likewise be employed. In addition, the heat seal compositions described in U.S. Pat. No. 4,058,649, the disclosure of which is incorporated herein by reference in its entirety, can be employed.

The multiply structure of the present invention can have an overall thickness within a wide range, but it is preferably from about 0.5 up to about 1.75 mils in thickness. When the substrate is the homopolymer polypropylene it can have a film thickness of approximately 1 mil. In this instance, the associated coextruded skin layer can be present in a thickness of from about 0.02 to about 0.12 mils.

The primer dispersion, to be applied to the surface of the skin layer, can have a solids concentration of from about 0.1% up to about 25%. The primer dispersion can be applied to the surface of the skin layer utilizing standard coating techniques so that a dry coating weight of from about 0.05 up to about 0.25 gram/1,000 square inches of film is obtained. The thus coated film can be subsequently passes through a hot air oven to completely remove water and/or a solvent. Subsequently, this primer coated film can be coated with the appropriate heat seal polymer latex also using standard coating techniques, such as, gravure, roll coating, and the like. The heat seal coated system can thereafter be dried by passing it through a conventional hot air oven.

The amount of acrylic polymer applied to the substrate may be varied over a wide range depending upon the specific properties desired in the final film product. Coating weights of from about 0.3 to about 1.2 grams per 1,000 square inches may be employed. If a 2-sided coated film is desired, optional but beneficial corona treating of the blend coated substrate, the priming and the opposite heat seal polymer application can be repeated, either in-line or out-of-line.

In the following examples, the base film and its associated, coextruded LVLDPE layer is biaxially oriented by conventional means. In general, this includes forming the base film in sheet form and machine direction orienting (MDO) or stretching the same at the appropriate or optimum temperature, using transport rollers operating at different speeds. After the desired degree of MDO, the film is transverse direction oriented (TDO), for example, in a tentering apparatus, to impart an orientation or stretching which is at right angles to the MDO. The extent of orientation can be from about 3 to about 10 times its original dimension for the MDO and from about 3 to 10 times in the TDO.

In the following examples, the base films are all biaxially oriented by conventional means. In general, this biaxial orientation is accomplished by stretching the coextruded system on a stretching apparatus manufactured by the T. M. Long Company. The apparatus essentially consists of an oven enclosing a rectangular stretching frame, the opposing sides of which can be caused to move apart while still retaining the rectangular configuration. Each side of the stretching frame is fitted with a plurality of pneumatically actuated pistons whose function it is to grip the sample plaque around its perimeter thereby transmitting to the sample the force required to stretch it. In practice the sample is introduced into the stretching frame, gripped by the pheumatically actuated pistons, and heated to the desired temperature. It is then stretched to the desired extent and at the desired rate in either or both directions. The extent of orientation can be from about 3 to about 10 times its original dimension and then about 3 to 10 times in a perpendicular direction to the first stretch.

It is also conteplated that the LVLDPE containing layer can be applied to the polypropylene film after the polypropylene has been machine direction oriented. In this event, the LVLDPE containing layer will only be transversely oriented while the polypropylene film will be biaxially oriented. The techniques of U.S. Pat. Nos. 3,620,825 and 3,671,383 (the disclosure of which are incorporated herein in their entirety by reference) can be employed.

In the following examples the ESM heat seal test is a heat seal test designed to simulate conditions under which films might be sealed in a typical over-wrapping machine. For the test two strips of film are cut, 3 by 14 inches, with the long direction being in the machine direction orientation of the film. The two strips of film are superimposed with coated surfaces, i.e., the acrylic surfaces, in contact and place in a heat sealing machine with one movable heat sealing platen. On actuation, the heated platen lowers and contacts the film combination for a controlled period of time. The pressure used is that resulting from the force of a pressure cylinder set at about 5 psi and the time of contact is two seconds. A plurality of separate seals are simultaneously made on each strip of film. The film strips are cut one inch wide and the seal strengths are determined by placing the free ends of the film in the jaws of a Sutter testing maching and pealing the seals apart at a rate of 20 inches per minute. The maximum force in grams is recorded as the heat seal strength.

Also, with respect to the following examples, a crimp seal test is carried out. This is designed to simulate conditions encountered in a device known in the industry as a "vertical form-and-fill" packaging machine. This type of machine is designed to horizontally crimp seals cross a tube of packaging material, dispense product into the tube, and, thereafter, again horizontally crip seal the opposite end of the tube to form a filled, sealed tubular package. Simultaneously with the sealing of the tube, the tube is severed. In the crimp seal test two heated platens with serrated surfaces are brought together by air pressure at 20 pounds per square inch on either side of the film strips for three-quarters of a second, then separated. Testing of the seals is carried out as above.

EXAMPLE 1

The film is a biaxially oriented coextruded hompolymer isotactic polypropylene core having surface layers of LVLDPE on both sides thereof. The polypropylene is a material obtained from U.S.X. Corporation and identified as Novamont 040R with a 4–5 melt flow. The linear very low density copolymer of ethylene and a $C_4$–$C_8$ alpha olefin (wt.% ratio of about 8.5:1.5 respectively) was obtained from Union Carbide Corporation and is identified as DFDA 1138, 0.4MI, having a density of 0.900 g/cc. In testing the sealability of this material using 260° F./formed Crimp Seals and 260°–280° F./formed ESM seals, the former failed at 410 g/inch and the later at 310 g/inch. The film structure was 0.85 mils in thickness with the skin layers of LVLDPE being approximately 0.05 mils each. The orientation of the films was five times in the machine direction and seven times in the transverse direction.

The results of this example illustrate that the LVLDPE containing heat seal surface provides an excellent heat seal bond and the art is thereby provided with another effective heat seal surface for oriented films, such as polypropylene.

EXAMPLE 2

A biaxially oriented homopolymer isotactic polypropylene film of approximately one mil thickness was coated with the primer reaction product of the acidified aminoethylated vinyl polymer and epoxy resin of Example 5 of aforementioned U.S. Pat. No. 4,214,039. The same general coating process of said examples was employed in coating the polypropylene film. The dry coating weight of the primer material was equivalent to about 0.10 grams per 1,000 square inchs of film. To the surface of the primer was applied a heat seal layer from an aqueous latex comprising a terpolymer resulting from the polymerization of about 82% by weight of vinylidene chloride, about 14% by weight of ethyl acrylate and about 4% by weight of acrylic acid. The coating was dried to yield a coating weight of approximately 2.6 grams per 1,000 square inches of film. In testing the sealability of 260° F. formed Crimp Seals and 250°-290° F. formed ESM seals of this material, the former failed at 450 g/in. and the later at 452 g/in.

EXAMPLE 3

Example 2 is repeated except that the primer composition and heat seal composition is deposited onto the LVLDPE surface of a coextruded biaxially oriented composite film of the same polypropylene as in Example 2 and the linear very low density copolymer of ethylene and a $C_4$-$C_8$ alpha olefin (wt.% ratio about 8.5:1.5 respectively) is DFDA-1137, having a density of 0.906 g/cc and obtainable from Union Carbide Corporation. The combined thickness of the coextruded film is approximately 1 mil with the LVLDPE amounting to approximately 6% of the total thickness. The Crimp Seal and ESM Seal strength of this material will exceed that of Example 2.

When the LVLDPE is blended with polypropylene to form the skin layer or layers on the base layer it can be in the ratio of about 2-100 wt.% LVLDPE and 98-0 wt.% polypropylene.

It has been determined that after the application of the primer layer and the heat seal layer it is advantageous to permit the structure to age for a certain minimum period of time in order to obtain the outstanding high heat seal bond that results from the present invention. Optimum aging can be accomplished over a period of time ranging from about 25 hours to about 21 days while maintaining the film at a temperature ranging from about 32°-150° F.

Although the present invention has been described with preferred embodiments, it is to be understood that modifications and variations may be resorted to without departing from the spirit and scope of this invention. Such variations and modifications are considered to be within the purview and scope of the appended claims.

What is claimed is:

1. A laminar thermoplastic film comprising a substrate comprising a polyolefin layer having on at least one surface thereof a layer comprising a linear very low density copolymer of ethylene and a $C_4$-$C_8$ alpha olefin. or a blend of (1) said copolymer and (2) a polyolefin wherein the density of said copolymer is from about 0.890 to less than 0.900 g/cc.

2. The film of claim 1 wherein said substrate is polypropylene.

3. The film of claim 2 wherein said copolymer or said blend is on one side of said substrate layer.

4. The film of claim 2 wherein said copolymer or said blend is on both sides of said substrate.

5. The film of claim 2 in its biaxially oriented state.

6. the film of claim 1 wherein the weight percent of said alpha olefin in said copolymer is from about 11-20.

7. A heat sealable multi-layer structure comprising:
(a) a substrate comprising a polyolefin film;
(b) a layer on at least one surface of (a), said layer comprising a linear very low density copolymer of ethylene and a $C_4$-$C_8$ alpha olefin or a blend of (1) said copolymer and (2) polypropylene wherein said copolymer has a density of from about 0.890 to less than 0.900 g/cc;
(c) a primer coating between layers (b) and (d) on at least one of said layer (b); and
(d) a heat sealable layer on said coating (c) said heat sealable layer being a member selected from the group consisting of a vinylidene chloride polymer and an acrylic polymer.

8. The structure of claim 7 wherein said polyolefin film comprises hompolymer polypropylene interblended with from 0 to about 15 parts by weight of said layer (b).

9. The structure of claim 8 wherein said primer comprises a member slected from the group consisting of poly(ethyleneimine); the reaction product of an acidified aminoethylated vinyl polymer and an epoxy resin; the condensation product of a monoaldehyde with an interpolymer of acrylamine or methacrylamide and at least one other unsaturated monomer; and the condensation product of aminoaldehyde with acrylamide or methacrylamide interpolymerized with at least one other unsaturated monomer in the presence of a $C_1$-$C_6$ alkanol.

10. The structure of claim 9 wherein said layer (b) is on one surface of substrate (a).

11. The structure of claim 9 wherein said layer is on both surfaces of substrate (a).

12. The structure of claim 7 wherein said heat selable layer comprises a vinylidene chloride copolymer containing at least 50% by weight of vinylidine chloride.

13. The structure of claim 7 wherein said heat sealable layer comprises an interpolymer of (a) a minor amount by weight of acrylic acid, methacrylic acid or mixtures thereof and (b) a major amount of neutral monomer esters comprising (1) methyl acrylate or ethyl acrylate and (2) methyl methacrylate.

14. The structure of claim 7 wherein said heat sealable acrylic polymer is on one surface of the structure and said heat sealable vinylidene chloride polymer is on the opposite surface of said structure.

15. The structure of claim 7 wherein the weight percent of said alpha olefin in said copolymer is from about 11-20.

* * * * *